United States Patent [19]

Ewald et al.

[11] 4,054,976
[45] Oct. 25, 1977

[54] COMBINED PRECISION BORING AND BURNISHING TOOL

[75] Inventors: Nis-Friedrich Ewald, Monchen-Gladbach-Rheindahler; Hans-Georg Augustin, Erkelenz, both of Germany

[73] Assignee: Wilhelm Hegenscheidt GmbH, Erkelenz, Germany

[21] Appl. No.: 678,716

[22] Filed: Apr. 20, 1976

[30] Foreign Application Priority Data

Apr. 24, 1975 Germany .............................. 2518170

[51] Int. Cl.² ............................................. B24B 39/00
[52] U.S. Cl. ......................................... 29/90 R; 407/1
[58] Field of Search ........................ 29/90 R, 566, 567; 408/83

[56] References Cited

U.S. PATENT DOCUMENTS

| 3,242,567 | 3/1966 | Adam et al. ...................... 29/90 R X |
| 3,980,442 | 9/1976 | Riekeles ............................... 29/90 R |

Primary Examiner—Othell M. Simpson
Assistant Examiner—Z. R. Bilinsky
Attorney, Agent, or Firm—Michael J. Striker

[57] ABSTRACT

A combined tool for precision boring and burnishing a tubular workpiece includes a bore head and a burnishing head which are advanced by a feed tube into the interior of the tubular workpiece while the latter is rotated about its axis. In order to reduce the stresses on the three above-mentioned elements and to avoid markings on the finished surface, two of the three elements are connected by a coupling, which while transmitting torque between the two connected elements, permits limited deviations of the axes thereof.

9 Claims, 12 Drawing Figures

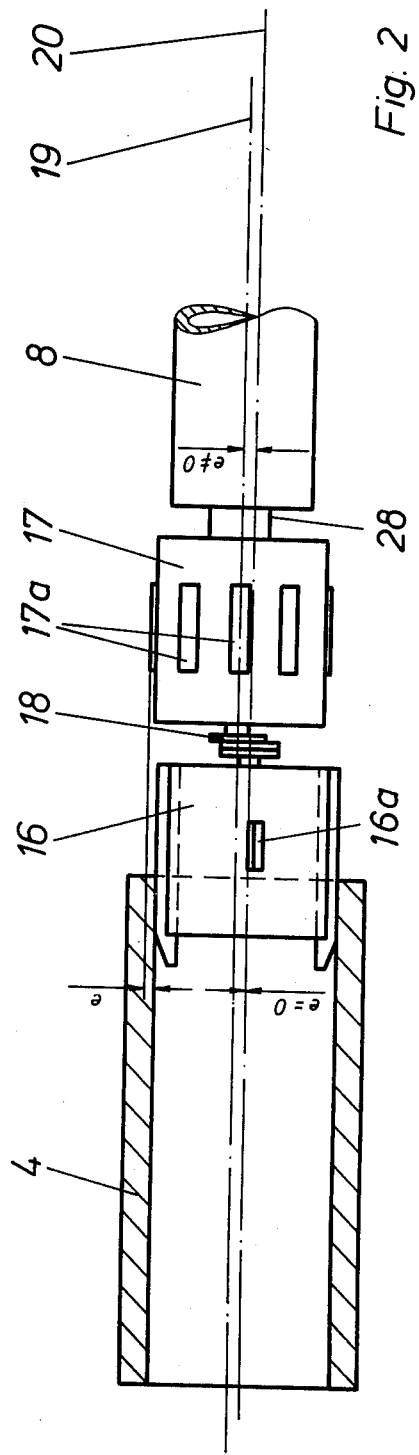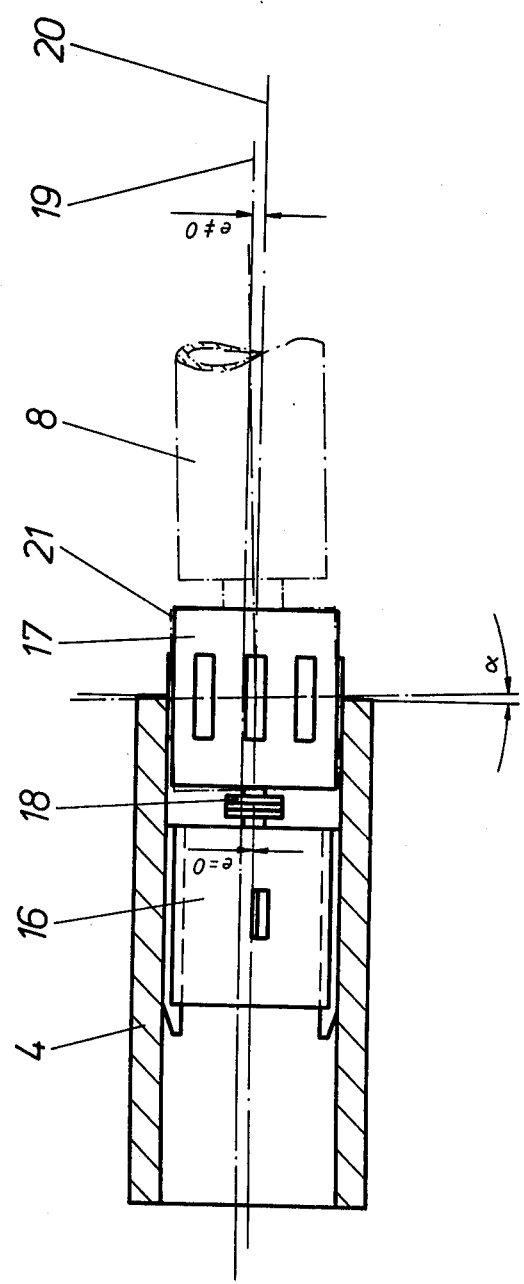

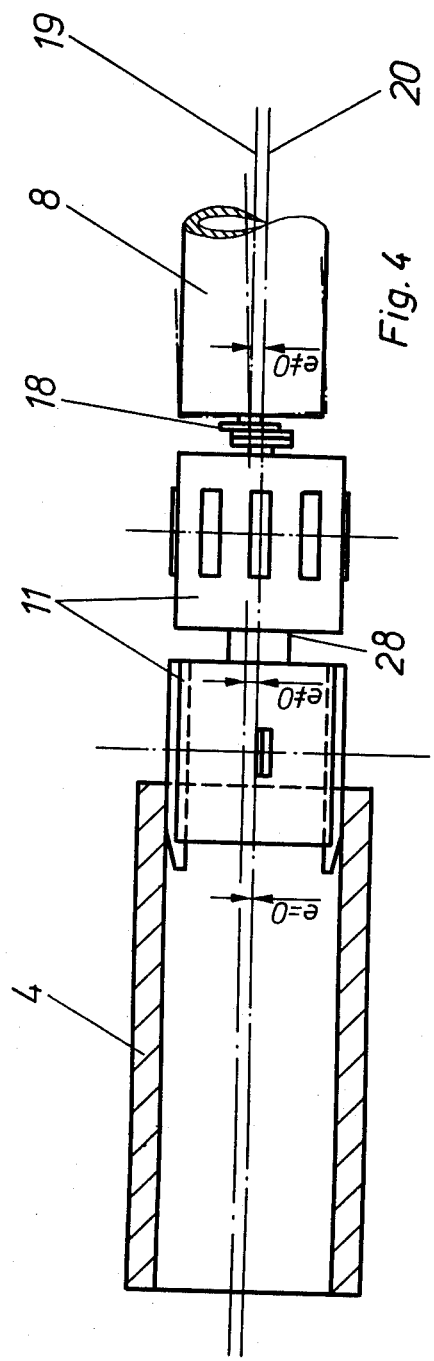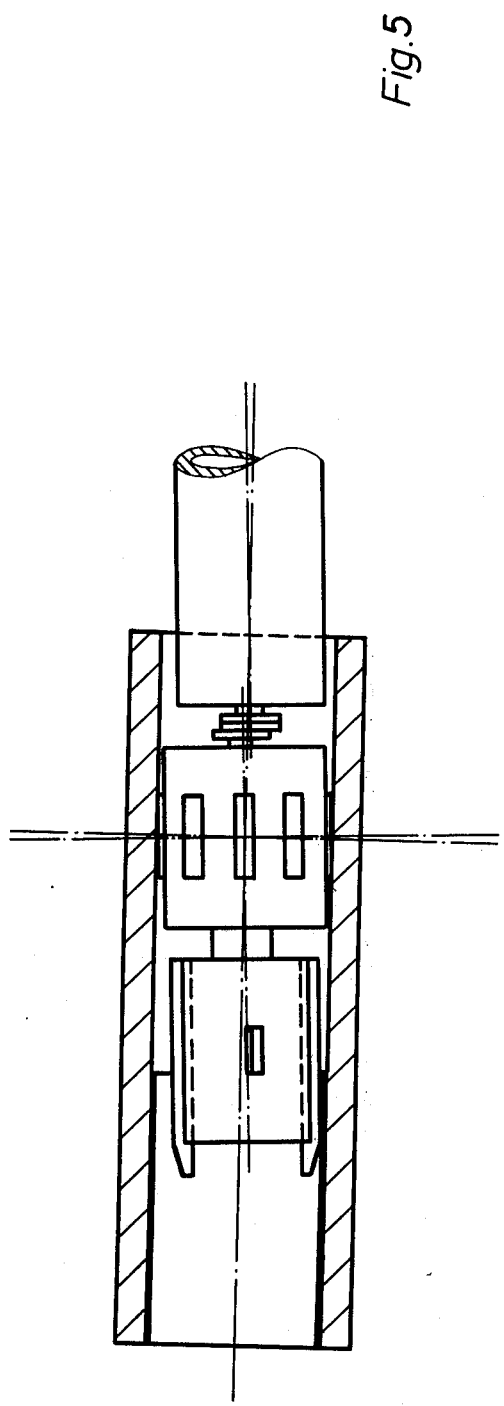

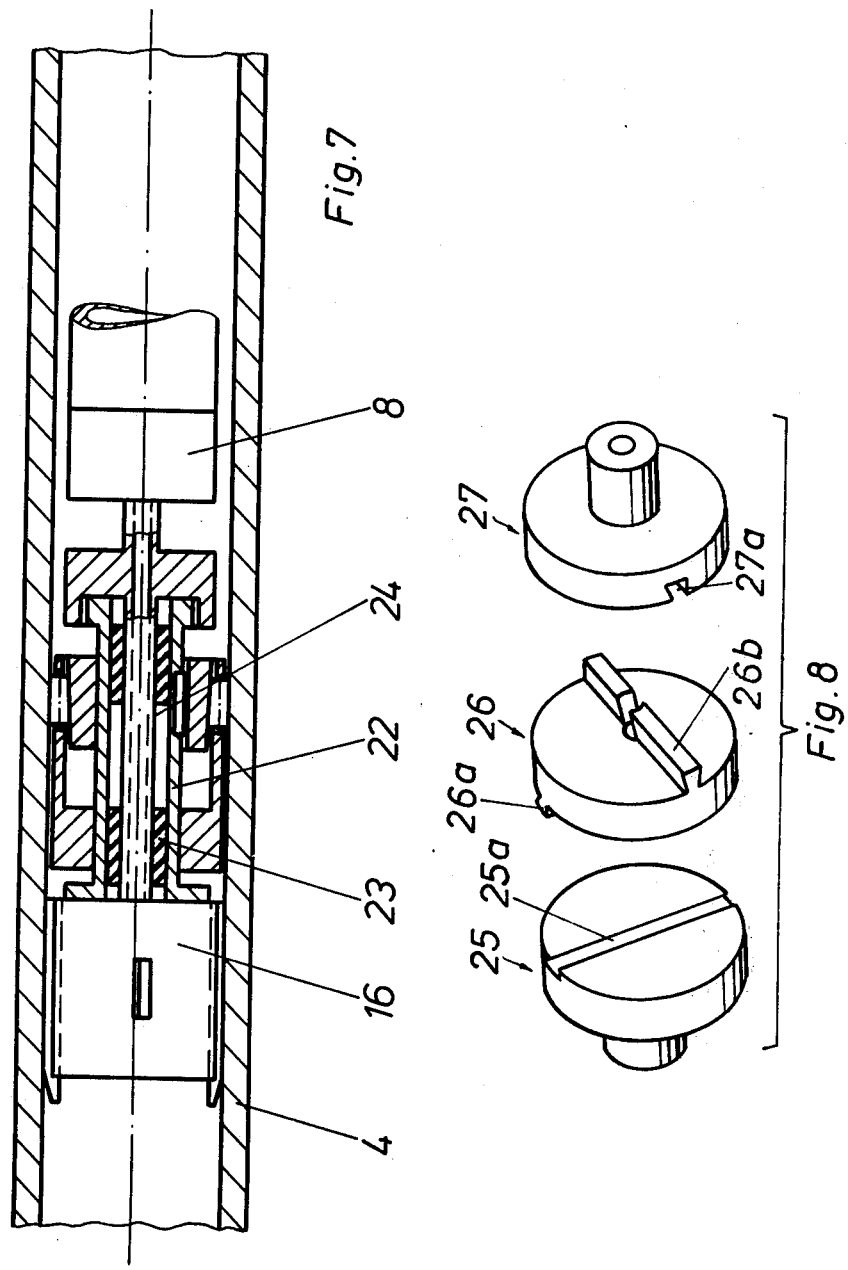

COMBINED PRECISION BORING AND BURNISHING TOOL

BACKGROUND OF THE INVENTION

The present invention relates to a combined tool for precision boring and burnishing tubular workpieces.

Inner surfaces of bores requiring a high surface quality are mostly produced in three steps, that is preboring, finish boring, and honing.

Since honing is a very time consuming method attempts have been made to replace this honing step by a less time-consuming one.

The honing step has therefore been replaced by a step of smooth rolling or burnishing the inner surface of a tubular workpiece. In this way, the manufacture of high quality bores, as for instance required for cylinder bores of pneumatic or hydraulic cylinders, has been considerably reduced in cost. In principles, one can therefore divide the manufacture of such bores into a material removing step and a non-cutting finishing step.

The German patent 958,896 discloses a combined tool for carrying out these two steps in a single operation. Thereby it is assumed that the workpieces which are to be machined with such a combined tool are already provided with an internal bore, that is that the above-mentioned first step of preboring is already carried out before the tool is used.

Further developed tools of the aforementioned kind are disclosed in the German Offenlegungsschrift No. 2,209,234.

In these known tools, the boring head is rigidly connected with the trailing burnishing head. This combined tool is, for instance, during use in a known boring machine, rigidly connected with the boring bar. The tubular workpiece to be machined is mounted between two cones of a common boring machine and rotated by means of a driver. The precision boring head is provided with guide bars which abut against the inner surface of the bore formed in the cylinder to be machined. When the combined tool is advanced by the boring bar, the knives on the boring head will machine the preformed cylinder bore to a predetermined inner diameter. During further advance of the combined tool by means of the boring bar, the rollers of the burnishing head will engage the inner cylindrical surface of the workpiece and roll this surface smooth. The problem of properly removing the shavings produced by the combined tool is solved in accordance with the teachings of the mentioned German Offenlegungsschrift No. 2,209,234.

While properly removing of the chips or borings formed by the combined tool does not provide any difficulties any longer, the aforementioned described combined tool is, while being located in the bore to be machined, statically overdefined, which results in a considerable wear on the guide bars of the boring head. In addition, the thus-constructed tool is subjected to oscillations which leave marks on the surface to be machined, which are not completely eliminated by the subsequent rolling operation.

The combined precision boring and burnishing tool in which the boring head and the burnishing head are rigidly connected to each other is guided in the bore to be machined on the one hand by the guide bars of the boring head and on the other hand by the rolls of the burnishing head. The combined tool is, however, also rigidly connected with the boring bar which, on the one hand, is supported and guided at a portion distant from the tool in the stuffing box of an apparatus for feeding boring oil into the hollow bore bar and, on the other hand, by its connection with the combined tool through the rolls of the burnishing head. Due to misalignment between the axis of the workpiece and the axis of the machine tool on the one hand, and due to the considerable weight of the boring bar on the other hand, the latter, thus supported between two points may be bent in any plane. The connection between the combined tool and the boring bar is then, when the combined tool is located in the bore to be machined, subjected to bending and shearing forces. This will result in that the combined tool, located in the bore to be machined, will also be bent, in a direction opposite to the bending of the boring bar. This in turn will result into an undesired tilting of the cutting knives of the boring head and in addition in undesired change of the tearshaped impressions which the rolls of the burnishing head produce on the surface to be finished. The radial forces which the workpiece produces in the tool during bending of the combined boring and burnishing tool will also lead to a premature wear on the guide bars and on the burnishing rolls. The thus-produced force by the bent boring rod and by the bent tool onto the workpiece will often result in rifling and chattering conditions which cannot be properly suppressed.

A further tool for precision boring and burnishing of tubular workpieces is disclosed in the German Gebrauchsmuster No. 7,344,800. In this known tool, the inner surface of the workpiece is precision bored while the combined tool advances into the bore to be machined and, during the subsequent withdrawal of the combined tool, in which the knives on the boring head are removed, the thus-precision bored inner surface is rolled smoothly by the rolls of the burnishing tool. During the advance of the combined tool, the burnishing rollers are not in contact with the workpiece and during retraction of the tool, the knives of the burnishing head, which have been removed, are evidently not in contact with the workpiece. During operation of this tool, there will not arise a statically overdefined situation, and while the combined tool may tilt with respect to the axis of the tubular workpiece, such tilting will not produce any detrimental effects.

A disadvantage of the last-mentioned tool, as compared with the first-described tools is, that the necessary time for finishing the workpiece is considerably increased. Whereas in the first-described tools, the bore to be machined is precision bored and smoothly rolled during advance of the tool into the workpiece and the withdrawal of the tool can therefore be produced at considerably greater speed, in the last-mentioned tool the speed at which the workpiece has to be retracted has to be the same as the speed in which the workpiece is advanced, which evidently increases the necessary time for finishing the workpiece.

Therefore, the last-mentioned tool has not found great use in the art.

SUMMARY OF THE INVENTION

It is an object of the present invention to provide a combined precision boring and burnishing tool which avoids the disadvantages of the above-described tools.

It is a further object of the present invention to provide a combined tool for precision boring and burnishing of tubular workpieces in which the precision boring and subsequent smooth rolling of the desired diameter can be carried out in a single operation during advance of the combined tool into the tubular workpiece, without creating undesired marks on the surface to be finished and without undue high wear of the tool.

With these and other objects in view, which will become apparent as the description proceeds, the present invention relates to a combined tool for precision boring and burnishing a workpiece which mainly comprises bore head means, burnishing head means arranged rearwardly of the bore head means, feed tube means for feeding said bore head means and said burnishing head means into the workpiece to be machined, first connection means for rigidly connecting two of the three first-mentioned means substantially aligned along a common axis, and second connection means for transmitting a moment to the third of the three first-mentioned means from at least one of the other two means while permitting limited deviation of said third means relative to said common axis. The second connection may be located between the bore head means and the burnishing head means or, on the other hand, the second connection means may be located between the burnishing head means and the feed tube means.

The second connection means may comprise a coupling permitting limited displacement of the axis of two means connected thereby parallel to each other and/or permitting a limited angular displacement of the axes of the two means which are connected by the coupling.

On the other hand, the first connecting means may extend between and rigidly connect the bore head means and the feed tube means aligned along a common axis and the second connecting means may comprise means mounting the burnishing head means on the first connecting means and tending to maintain said burnishing head means at said common axis, while permitting radial deviation of the burnishing head means from said common axis.

In this case the first connecting means may comprise a substantially rigid shaft connecting the bore head means and the feed tube means, whereas the second connecting means may comprise at least one resilient tubular element mounting the burnishing head means on the shaft.

The above-mentioned coupling may be in the form of an Oldham coupling, preferably slightly modified to connect to the two means or elements between which the coupling is located also for withdrawal in axial direction. Other couplings, as will be described later on, may also be used as the second connecting means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 schematically illustrates one embodiment of a combined tool according to the present invention for precision boring and burnishing a tubular workpiece, at the beginning of the machining operation, and in which the workpiece axis and the tool axis are slightly misaligned;

FIG. 3 is a view similar to FIG. 2 showing the combined tool during further advance into the workpiece;

FIG. 4 is a view similar to FIG. 2 in which a coupling is arranged between the burnishing head and the feed tube of the combined tool;

FIG. 5 illustrates the combined tool as shown in FIG. 4 during further advance thereof into the tubular workpiece;

FIG. 7 is a partially sectioned side view of an additional embodiment according to the present invention in which the burnishing head is floatingly mounted on a rigid element connecting the bore head and the feed tube aligned along a common axis;

FIG. 8 is an exploded view of a modified Oldham coupling, which may be used in the embodiments illustrated in FIGS. 2–6;

DESCRIPTION OF THE PREFERRED EMBODIMENTS

Figure 1:
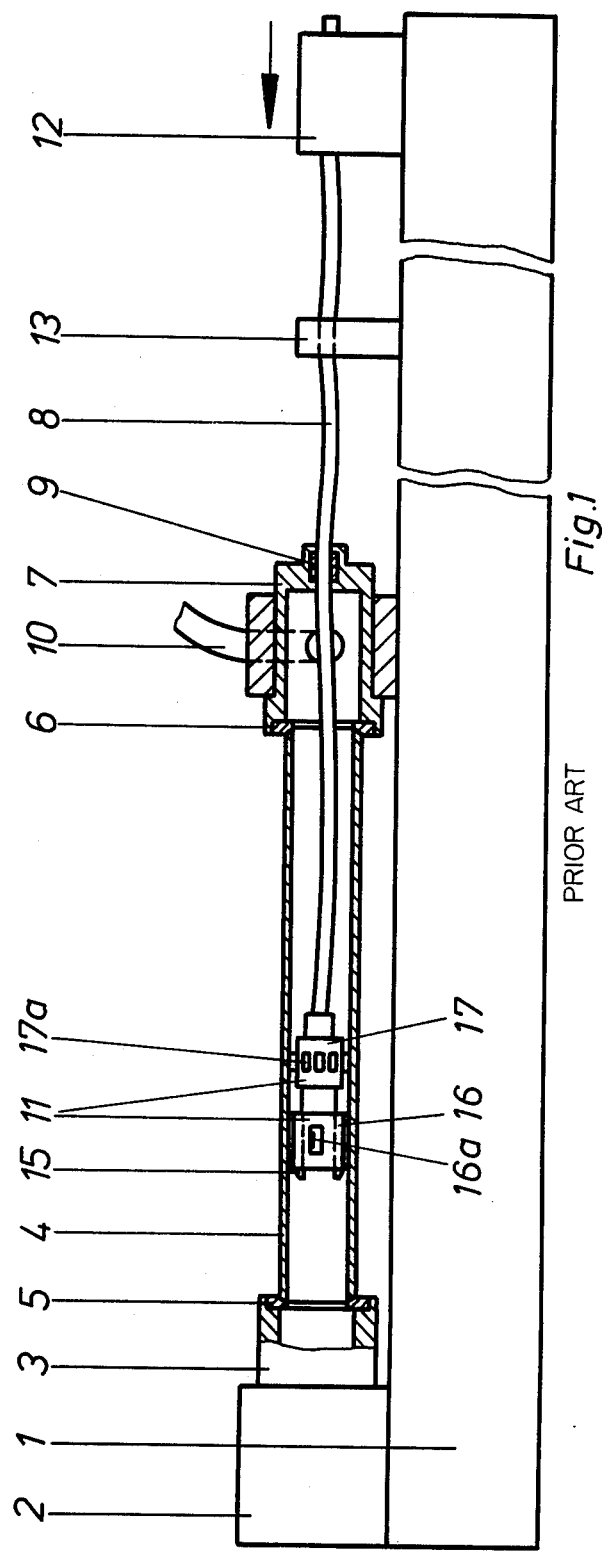
FIG. 1 is a schematic partly sectioned side view of a boring lathe for precision boring long tubular workpieces in accordance with the prior art.

FIG. 1 schematically illustrates a boring lathe for finishing the interior surface of an elongated tubular workpiece 4. The boring lathe includes a machine bed 1, which carries at one end thereof a spindle stock 2, having a cage 3 in which a receiving cone 5 is mounted rotatably about its axis. The tube or workpiece 4 is clamped between the receiving cone 5 and an opposite cone 6. The workpiece 4 is rotated about its axis by a known rotating means engaging the workpiece in the region of the cone 5, which rotating means are for simplification reasons not shown in the drawing. The cone 6 is rotatably mounted in a boring oil supplying apparatus 7. The apparatus 7 serves to feed boring oil into the tubular workpiece and in addition it serves to receive in the interior thereof the combined precision boring and burnishing tool 11, after the interior surface of the tubular workpiece 4 has been finished and the combined tool 11 is withdrawn from the interior of the tubular workpiece so that the latter, after being finished, may be removed from the boring lathe in lateral direction and replaced by a new one. The necessary boring oil, for facilitating the machining operation and for transporting the resulting chips or borings, is fed into the apparatus 7 through a tube 10 from a bore oil reservoir not shown in the drawing. The combined tool 11, which includes a boring head 16 with guide bars 15 and at least one boring tool 16a, and a burnishing head 17 provided with burnishing rollers 17a and connected to the downstream side of the boring head 16, is carried by a boring or feed tube 8. The tube 8 is advanced in the direction of the arrow, shown at the right end of FIG. 1, by a feed slide 12, mounted on the bed 1 movable in longitudinal direction. In view of the considerable length of the tube 8, the latter is preferably supported between the apparatus 7 and the feed slide by a steady rest 13. A stuffing box 9 is arranged at the end of the apparatus 7 at which the tube 8 enters, to prevent leakage of oil from the interior of the apparatus.

Figure 1A:
FIG. 1a schematically illustrates in an exaggerated manner the tilting which may occur between the various elements of such a combined tool known in the art.

FIG. 1 illustrates in an exaggerated manner a possible bending of the tube 8. Of special interest thereby is the bending of the tube 8 between the two supporting places, that is between the stuffing box 9 and the combined tool 11. If the various elements of the combined tool are rigidly connected to each other as disclosed in the above-mentioned prior-art patents, the axis of the burnishing head will tend to tilt according to the bending of the tube 8. The boring head 16 can, however, not follow the tilted position of the burnishing head 17, since the boring head 16 is already guided in the interior of the tubular workpiece 4. Initiated by the guide bars 15, a counter force will therefore result on the boring head 16 and this will result in a bending situation as exaggeratedly shown in FIG. 1a. The combined tool will thereby be clamped to certain extent in the interior of the tubular workpiece, resulting in oscillating and rifling conditions, which cannot or which can only very difficulty be controlled.

It is also possible, as shown in FIG. 2, that the tool axis 19 does not coincide with the workpiece axis 20 so that misaligning error will occur. In such a case, the misalignment error will be superimposed on the bending of the tube 8 which will evidently lead to a worsening of the situation. To avoid such undesired clamping of the combined tool in the interior of the tubular workpiece, a coupling 18 is located in the modification shown in FIGS. 2 and 3 between the boring head 16 and the burnishing head 17, in which the coupling 18 is constructed to permit limited parallel displacement of the axes of the boring head 16 and the burnishing head 17 relative to each other and this coupling may also be constructed to permit a limited angular displacement between the two axes. By use of such a coupling, the boring head 16 entering into the workpiece 4 can adjust its position so that the axis of the boring 16 will coincide with the axis of the tubular workpiece 4, without influencing the position of the following burnishing head. Since at the start of the finishing operation of the workpiece 4 it can be assumed that the overhanging length of the tube 8 is still very small, the bending of the tube 8 in the situation as shown in FIG. 2 is assumed with zero. When the combined tool is now further advanced into the workpiece so that the burnishing head 17 enters the interior of the tubular workpiece 4, as shown in FIG. 3, then the tube 8 will be forced by the burnishing head 17 to bend, due to the existing eccentricity e, in downward direction. The burnishing head 17 will thereby also be slightly inclined as indicated at 21 in dash-dotted lines in FIG. 3. The angular inclination $\alpha$ may not surpass a predetermined maximum value since otherwise a tear-shaped impression, as necessary for a perfect finished surface of the workpiece, cannot be obtained by the rolls of the burnishing head. The coupling 18 according to the present invention will prevent that, when the burnishing head assumes the inclined position, radial acting forces are transmitted to the boring head 16.

FIGS. 4 and 5 illustrate working situations similar to those shown in FIGS. 2 and 3. In the embodiment as shown in FIGS. 4 and 5 the coupling 18 is, however, located between adjacent ends of the burnishing head 17 and the tube 8. As evident from these two Figures, in this construction the combined tool 11 may be moved into the interior of the tubular workpiece 4, even if the common axis 19 of the boring head 16 and the burnishing head 17 is eccentrically arranged with regard to the workpiece axis 20, without imparting any bending forces onto the tube 8. A sag of the tube 8 is likewise taken up by the coupling 18. The tool 11 comprising the boring head 16 and the burnishing head 17 may therefore finish the interior surface of the workpiece 4 without undue stresses being imparted to the combined tool. Detrimental rifling and chattering conditions will not occur.

Figure 6:
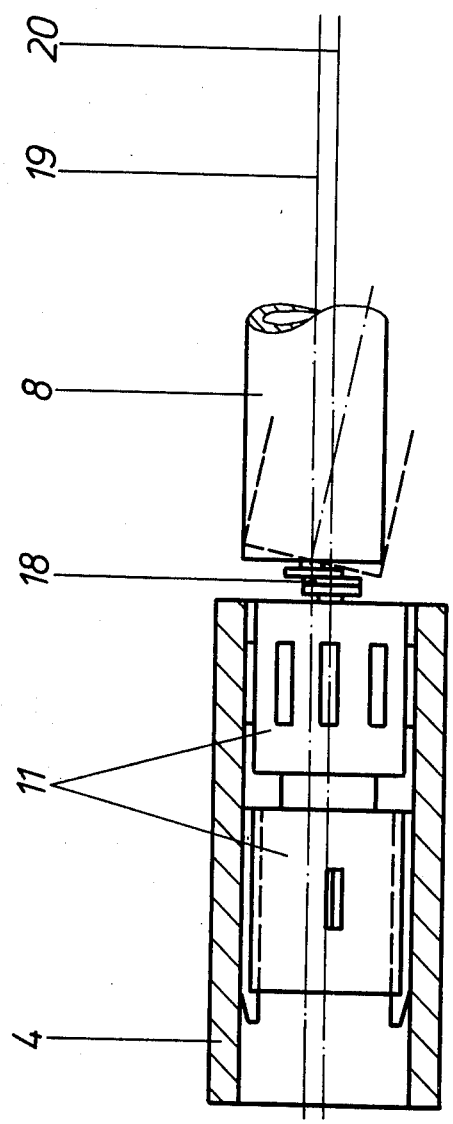
FIG. 6 is a view similar to FIG. 5 in which the axis of the feed tube is additionally inclined at an angle to that of the bore head.

FIG. 6 is a view similar to FIG. 5, in which the axis of the tube 8 is not only offset with regard to the axis of the workpiece 4, but also inclined relative thereto.

FIG. 7 shows a further modification according to the present invention, in which the boring head 16 and the tube 8 are connected in coaxial alignment by a rigid shaft 24. The burnishing head 22 is connected to the shaft 24 by resilient elements 23, which may, as shown, comprise two rubber sleeves mounting the burnishing head 23 on the shaft 24 and these resilient elements 23 tend to maintain the burnishing head 22 coaxial with the elements 16 and 8, while permitting the burnishing head 22 to tilt relative to the shaft axis. It is to be understood that the rubber sleeves or resilient elements 23 are fixedly connected at the inner peripheral surface to the shaft 24 and at the outer peripheral surface to the burnishing head 22. Due to the rigid connection of the boring head 16 and the tube 8, the boring head 16 cannot perform any undue tumbling motions when the guide bars 15 are worn. On the other hand, due to the floating mounting of the burnishing head 22 on the shaft 24, no undue clamping situation of either the boring head or the burnishing head will occur during the finishing of the inner surface of the workpiece.

As mentioned before, various couplings are usable in the arrangements shown in FIGS. 2-6, between the boring head and the burnishing head or between the latter and the tube 8.

One of the couplings suitable for this purpose is illustrated in FIG. 8 which shows in an exploded view a slightly modified Oldham coupling. The Oldham coupling illustrated in FIG. 8 comprises a first disc 25 to be connected to one of the elements between which the coupling is arranged, and the disc 25 is formed in an end face thereof with a transverse slot 25a, an intermediate disc 26 provided at opposite end faces thereof with transverse ridges 26a and 26b which extend normal to each other, and a third disc 27, to be connected with the other element between which the coupling is arranged, and which is formed with a transverse slot 27a adapted to receive the ridge 26b. The grooves and ridges are preferably dove-tailed, as indicated in FIG. 8, so that the coupling may also transmit axial forces in opposite direction. It is to be understood that the ridges 26a and 26b are respectively located with small clearance in the corresponding grooves, so that the coupling will also permit a slight tilting of the axes of the two elements which are connected by the coupling. The three discs 25-27 are formed with a central bore therethrough so that boring oil transmitted through the tube 8 may pass through the coupling.

Figure 9:
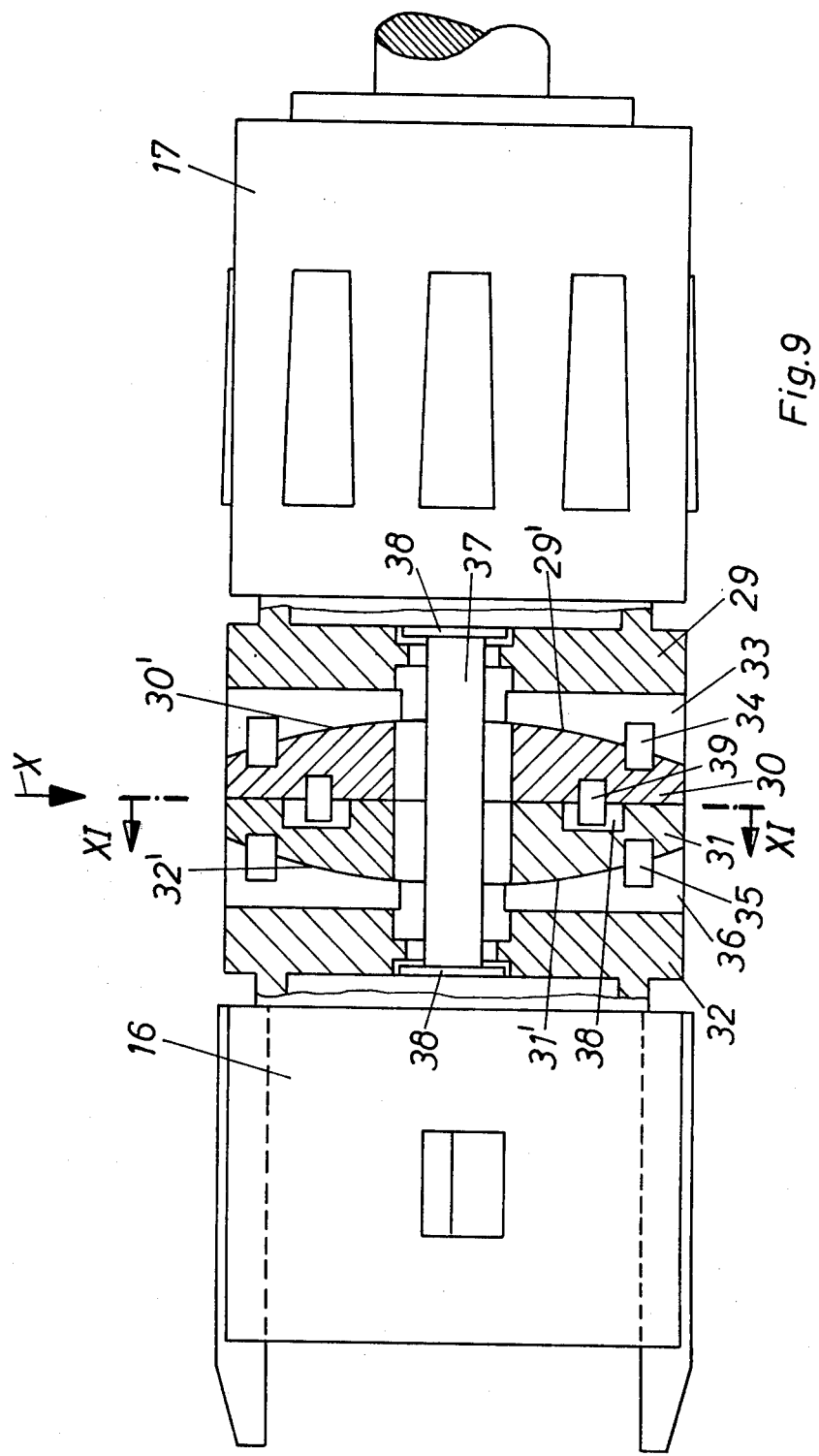
FIG. 9 is a partially sectioned side view showing a different kind of coupling located between the bore head and burnishing head.
Figure 10:
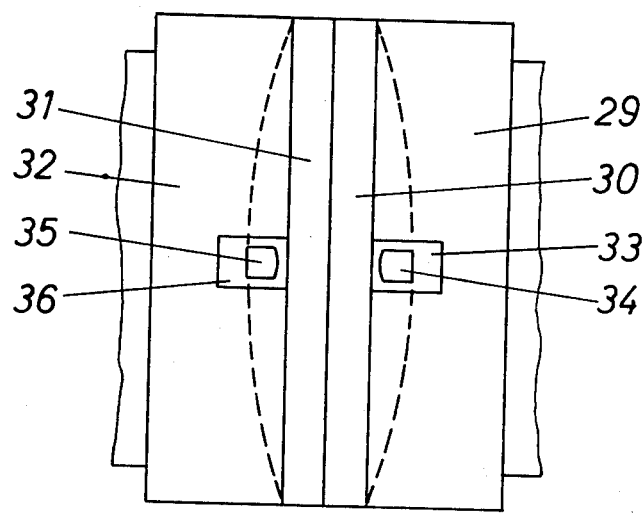
FIG. 10 is a partial top view of the coupling shown in FIG. 9, as viewed in the direction of the arrow X in FIG. 9.
Figure 11:
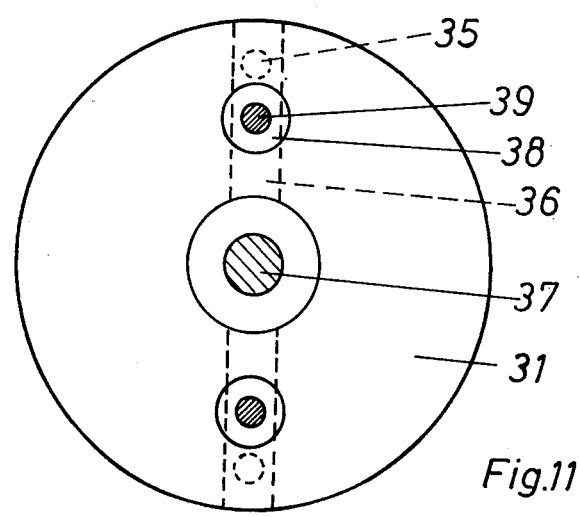
FIG. 11 is a cross-section taken along the line XI—XI of FIG. 9.

Another coupling suitable for the purpose of the present invention is illustrated in FIGS. 9-11. While these Figures illustrate a coupling located between the boring head 16 and the burnishing head 17, it is to be understood that such a coupling could also be arranged between the burnishing head 17 and the tube 8. The coupling illustrated in FIGS. 9-11 comprises a first element 29 fixedly connected for instance to the burnishing head 17 and having a part-spherical end face 29' which is in engagement with a corresponding part-spherical end face 30' of a disc 30 which is turn abuts with a flat end face against a corresponding flat end face of a second disc 31. The disc 31 in turn, abuts with its part-spherical end face 31' against a corresponding part-spherical end face 32' of a member 32 fixedly connected for instance to the boring head 16. Each of the elements 29 and 32 are formed with transverse slots 33 and 36, respectively, which extend from the respective part-spherical end faces of these elements into the latter. Pins 34 and 35 respectively project from the discs 30 and 31 with clearance into the slots 33 and 36, respectively. Additional pins 39 project from the flat end face of the disc 30 with clearance, as best shown in FIG. 11, into circular cutouts 38 extending from the flat end face of the disc 31 into the latter. As evident from this description, the coupling shown in FIGS. 9–11 is constructed to transmit a moment between the two elements connected by the coupling, for instance the boring head 16 and the burnishing head 17, while permitting lateral parallel variation of the axes of the two elements with respect to each other, as well as slight tilting of such axes. In order to transmit also axial forces in opposite directions between the two elements, the elements 29, 32 and the discs 30 and 31 are formed with a central bore through which a pin 37 extends with considerable radial clearance. The pin 37 is provided at opposite ends with heads 38 located with clearance in corresponding pockets formed in the elements 29 and 32, as most clearly shown in FIG. 9, so that the coupling will also transmit axial forces between the elements connected by the coupling.

It will be understood that each of the elements described above, or two or more together, may also find a useful application in other types of combined precision boring and burnishing tools, differing from the types described above.

While the invention has been illustrated and described as embodied in a combined tool for precision boring and burnishing the inner surface of a tubular workpiece, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A combined tool for precision boring and burnishing of a tubular workpiece comprising, in combination, bore head means; burnishing head means arranged rearwardly of the bore head means; feed tube means for feeding said bore head means and said burnishing head means into a workpiece to be machined; first connection means for rigidly connecting two of the three first-mentioned means substantially aligned along a common axis; and second connection means for transmitting a moment to the third of the three first-mentioned means from at least one of the two other means while permitting limited deviation of said third means relative to said common axis.

2. A combined tool as defined in claim 1, wherein said second connection means is located between said boring means and said burnishing head means.

3. A combined tool as defined in claim 1, wherein said second connection means is located between said burnishing head and said feed tube means.

4. A combined tool as defined in claim 1, wherein each of the three first-mentioned means has a longitudinal axis, and wherein said second connection means comprises a coupling permitting limited displacement of the axes of the two means connected thereby parallel to each other.

5. A combined tool as defined in claim 1, wherein each of said three first-mentioned means has a longitudinal axis, and wherein said second connection means comprises a coupling permitting limited angular displacement of the axes of the two means connected by said coupling.

6. A combined tool as defined in claim 1, wherein each of said three first-mentioned means has a longitudinal axis, and wherein said second connection means comprises a coupling permitting limited parallel displacement as well as limited angular displacement of the axes of the two means which are connected by the coupling.

7. A combined tool as defined in claim 1, wherein said second connection means is an Oldham coupling.

8. A combined tool as defined in claim 1, wherein said first connection means extends between and connects said bore head means with said feed tube means spaced from each other substantially aligned along said common axis, and wherein said second connection means comprises means mounting said burnishing head means on said first connecting means, said mounting means being constructed to permit slight radial deviation and slight tilting of said burnishing head means relative to said common axis while tending to maintain said burnishing head means on said common axis.

9. A combined tool as defined in claim 8, wherein said first connection means comprises a substantially rigid shaft connecting said bore head means and said feed tube means, and wherein said second connection means comprises at least one resilient tubular element mounting said burnishing head means on said shaft.

* * * * *